June 16, 1959   W. H. BROWN, JR   2,890,587
OPEN NOZZLE
Filed Jan. 12, 1955

INVENTOR.
Walter H. Brown, Jr.
BY
Barlow & Barlow
ATTORNEYS.

United States Patent Office 2,890,587
Patented June 16, 1959

2,890,587

OPEN NOZZLE

Walter H. Brown, Jr., Cranston, R.I., assignor to B-I-F Industries, Inc., a corporation of Rhode Island Application January 12, 1955, Serial No. 481,289

1 Claim. (Cl. 73—215)

This invention relates to an open nozzle or flume and more particularly to apparatus for use with such a device, which will facilitate the zero adjustment of the registering apparatus used therewith.

An open nozzle such as is disclosed in Patents Nos. 2,100,219 and 2,264,796 is simply a measuring device for determining the rate of flow of liquid in pipes which do not run full. The nozzle is constructed of a special shape which produces a fairly uniform head versus flow characteristic. There is provided in the nozzle a pressure port of piezometer connection in or adjacent the bottom wall of the nozzle which when used with proper indicators will register the rate of flow through the nozzle. In order to calibrate the registering instrument used with the nozzle, it has been necessary to close off this pressure port to the bottom of the nozzle and install, in the pipe or duct leading to the metering device, a so-called zero test pipe. This zero test pipe is connected in the duct and either has an open upper end which would be set to the level of the bottom of the nozzle, or consists of a gauge glass with a scale. Thus, when it was desired to zero the indicating instrument, it was necessary to close off the pressure port to the nozzle and to open this zero test pipe so that liquid in the metering connection would assume the same level as the bottom of the nozzle. Due to locations of the nozzle in certain installations, it has been quite difficult to adjust the level of the top of the test pipe or calibrate the scale on the glass gauge so that it agreed with the level of the bottom of the nozzle generally due to the remote locations of the two parts, and it has therefore become desirable that some means be utilized integral with the nozzle to calibrate the measuring apparatus to zero level.

It is therefore one of the objects of the invention to provide in association with a pressure port to the bottom of the nozzle a zero check means which operates in conjunction therewith.

A further object of the invention is to provide in an open nozzle having a pressure port at the bottom thereof means to close off this pressure port and further means to open the metering connection to the registering apparatus so that the level of liquid therein will be at the same level as the bottom of the nozzle, at which point the pressure port or piezometer connection is made.

With these and other objects in view, the invention consists of certain novel features of construction as will be more fully described and particularly pointed out in the appended claim.

Figure 1:
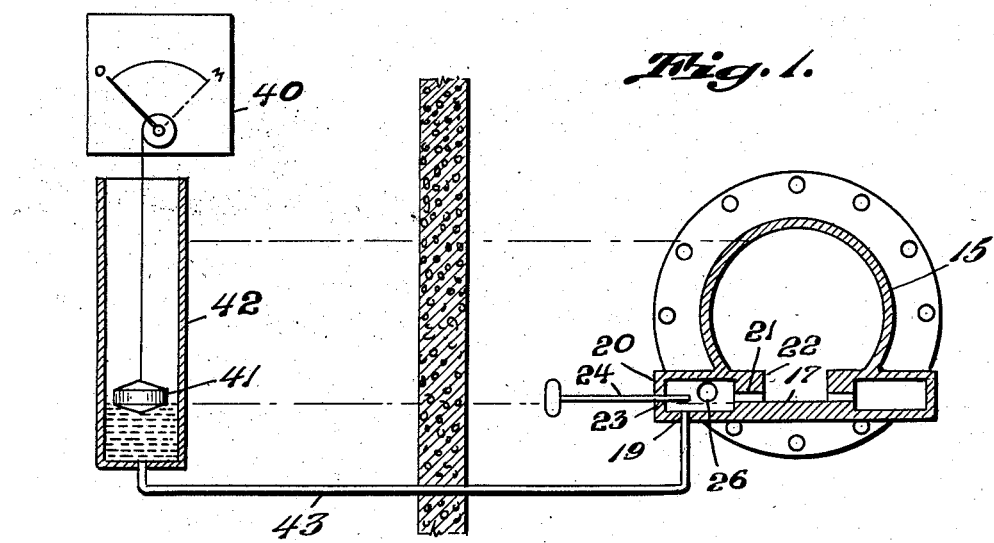
Figure 2:
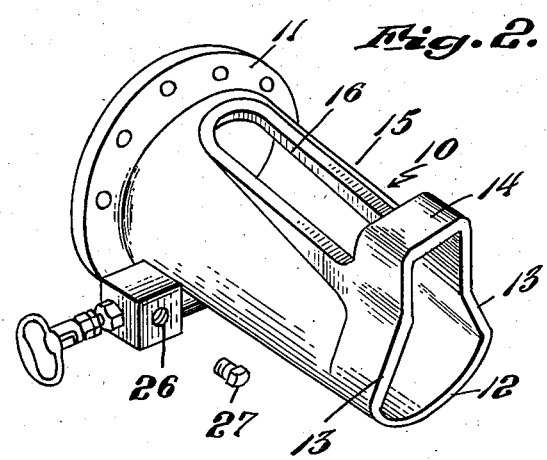

In the accompany drawings:

Figure 1 is a sectional view taken through the nozzle, showing the pressure connection and the metering pipe leading over to a metering device which is illustrated as a stilling well; and Figure 2 is a perspective view of a complete open nozzle constructed in accordance with the invention.

In proceeding with the invention, I provide a pressure port to an open nozzle and associate with this port a valve means which is adapted to close it off. On the metering side of the valve means I provide a zero check tap which communicates with the metering port and which may be opened when the valve means to the nozzle is closed.

Referring now to the drawings, there is shown a nozzle generally designated 10 having an attached flange 11. The nozzle 10 is provided with a generally trough-shaped bottom wall 12 with side walls affixed thereto, the side walls being arranged in a convergent relationship terminating in a bridge piece 14 across the top end thereof. Inwardly of this nozzle end there is provided a generally cylindrical portion 15 which has an opening 16 in the top thereof, this cylindrical portion 15 converging toward the open end of the nozzle.

In a construction which is more particularly shown and described in Patent No. 2,264,796, dated December 2, 1941, the static pressure connection is taken from the nozzle through a hole 19, which communicates with a boss 20 forming a chamber. This chamber in turn communicates with the interior of the nozzle through a pressure port 21 that is drilled through the protuberance 22 so that the port 21 opens on a vertical face of the protuberance 22 at the buttom of the nozzle. It will be noted that the port 21 communicates with the trough at a level so that the bottom of the port 21 is at the same level as the bottom of the interior of the cylindrical portion 15 of the nozzle. An opening 23 is provided which communicates with the interior of the chamber and is inalignment with the port 21. Mounted in this opening 23 is a cleaning means comprising a plunger 24 which can be pushed through the chamber and into the port 21 for the removal of any dirt or foreign matter that may in time lodge therein. Additionally, this plunger 24 serves as a valve means which will close off the port 21 from communication with the interior of the chamber. A zero check tap is provided for communication with the chamber by means of a threaded bore 26 which is adapted to receive a threaded plug 27. This bore 26 has its invert at the same elevation as the invert of the nozzle represented by the bottom wall as at 17.

In the use of an open nozzle of the type just described for the measurement of liquid flow, the metering instrument or register 40 is usually operated by a float 41 in a stilling well 42 which may be located at one side of the nozzle and connected to it by a pipe 43 that connects with the chamber through the hole 19. In adjusting the registration of the metering instrument which should coincide with zero flow in the nozzle, small stand pipes have generally been used, such as is shown in the Hoppes Patent No. 1,215,533, dated Feb. 13, 1917. These test pipes, however, have not been entirely satisfactory in certain installations as pointed out before. In the present invention with the apparatus shown and described, it will be apparent that to check zero, the plunger 24 is first pushed in to close the pressure connection to the stilling well 42 by blocking off the port 21. This permits the nozzle to remain in use and by the removal of the plug 27 in the threaded bore 26, the stilling well 42 may be drained to the proper zero level as shown in Figure 1 and the registering meter 40 calibrated.

I claim:

An open nozzle comprising a protuberance projecting into the low area of said nozzle, said protuberance defining a horizontally disposed port with one end opening into the flow area, a boss exterior of said nozzle, said boss forming a chamber in fluid communication with the other end of said port, means supported by said boss and adapted to close off said port, said boss also forming a bore connecting the atmosphere to said chamber, said bore opening into said chamber on a level so that the invert thereof is at the same elevation as the invert of the nozzle for zeroing the level of an indicator, means cooperating with said bore to seal off the chamber from the atmosphere, and separate conduit means leading from said chamber to an indicator.

References Cited in the file of this patent

UNITED STATES PATENTS

| | | |
|---|---|---|
| 2,264,796 | Hartley | Dec. 2, 1941 |
| 2,286,919 | McNeill | June 16, 1942 |
| 2,352,157 | Bennett | June 27, 1944 |